C. J. TROPPMAN.
LENS TESTING INSTRUMENT.
APPLICATION FILED NOV. 4, 1914.
1,170,579.
Patented Feb. 8, 1916.
2 SHEETS—SHEET 2.
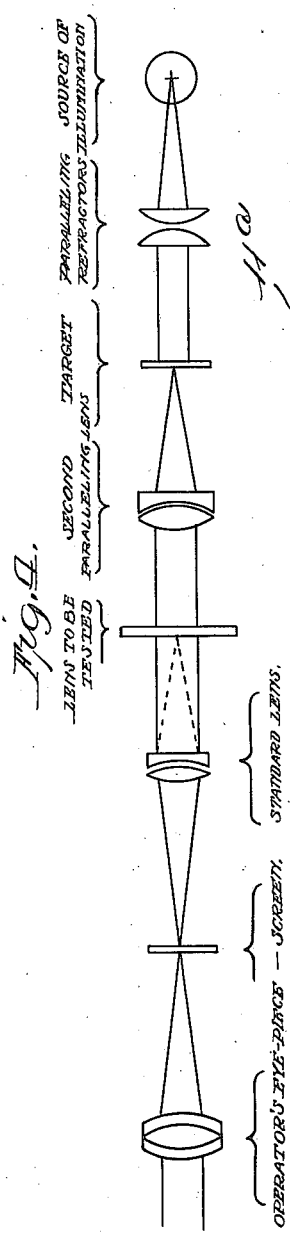
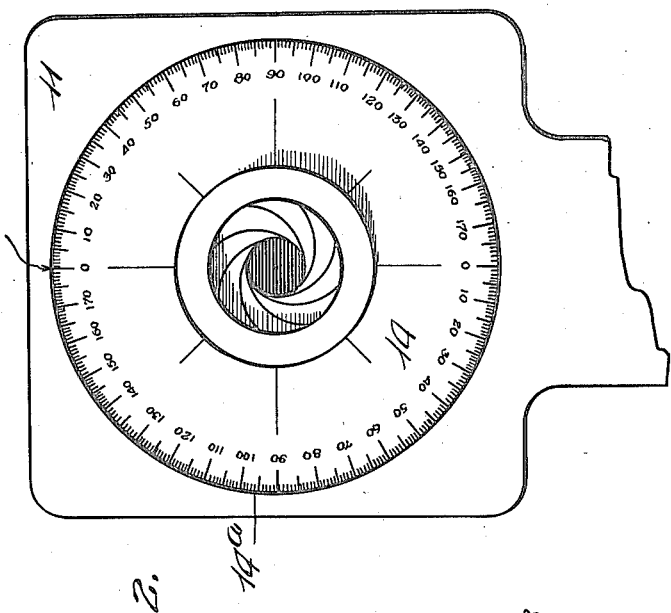
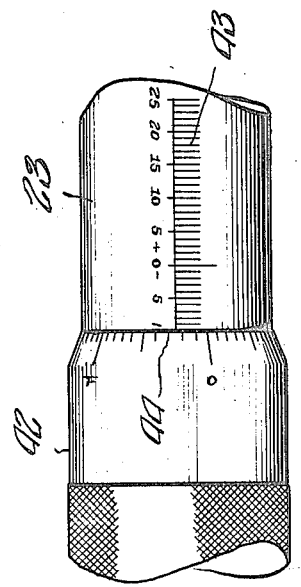
Witnesses:
Wm Harold Eichelman
M. H. McNally.
Inventor:
Charles J. Troppman.
By Benjamin, Roodhouse & Rundy,
attorneys

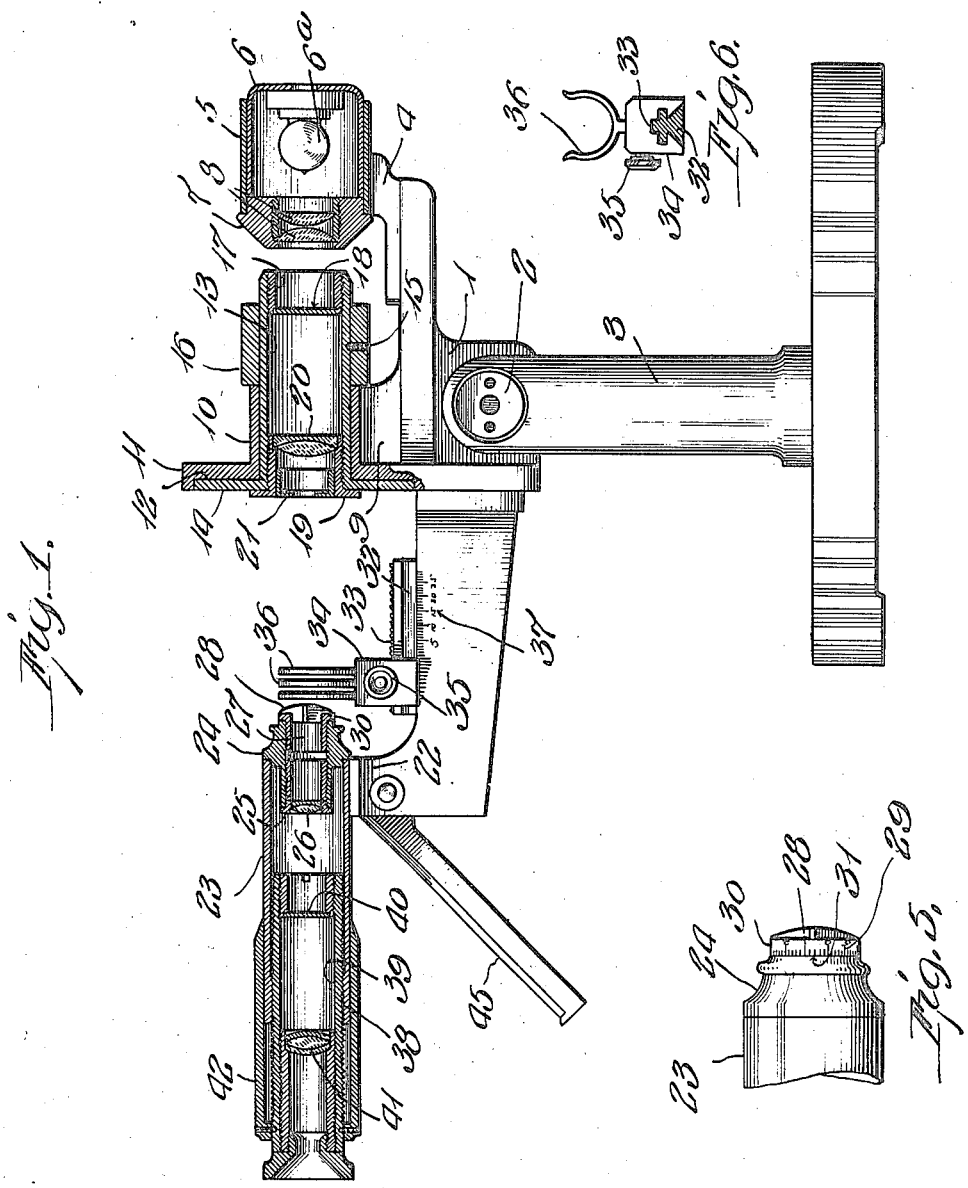

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

LENS-TESTING INSTRUMENT.

1,170,579.　　　Specification of Letters Patent.　　Patented Feb. 8, 1916.

Application filed November 4, 1914. Serial No. 870,237.

*To all whom it may concern:*

Be it known that I, CHARLES J. TROPPMAN, a citizen of the United States, and a resident of Chicago, in the county of Cook and State of Illinois, have invented certain new and useful Improvements in Lens-Testing Instruments, of which the following is a specification.

The introduction of ophthalmic lenses having a concavo-convex or spherical form in place of lenses the central plane of which were flat, has introduced a possibility of error in selecting a suitable lens of concavo-convex form to correct a particular abnormality of vision.

In lenses the central plane of which were flat, the nodal point or center of refraction of the curvature or the point from which the focal length or power of refraction of the lens must be calculated, was always inside the material of the lens, and could, without serious error, be regarded as a fixed point; but with lenses of a concavo-convex form the nodal point often falls an appreciable distance outside of the surface of the lens. Therefore, if a concavo-convex lens is placed in the same position before the eye as a lens of flat central plane would be, it will not produce the same correction as a lens of flat central plane of an equal focal length or power. The abnormality of the eye is usually ascertained by placing trial lenses before it until suitable correction is secured. These trial lenses are uniformly of flat central plane, and it is necessary, or at least desirable, with concavo-convex lenses, in filling a prescription to give to the patient not a lens of equal focal length or power, but a lens which will produce an equal amount of refraction or correction when used by him in his spectacles or glasses.

In designing a lens testing instrument to take care of the above difficulty, I have endeavored to reproduce conditions of refraction in a lens testing instrument similar to the conditions obtaining in connection with the human eye, so that not only can the absolute focalizing power of the lens be ascertained, but the power of the lens in the position it will be disposed in front of the eye can also be ascertained.

It will also be seen from the following description, taken in connection with the drawings, that I have designed an instrument of structural simplicity, and capable of a minute and high degree of accuracy.

I attain the above objects by means of the structure illustrated in the accompanying drawing, in which, Figure 1 is a longitudinal elevation of my improved lens testing instrument, the instrument proper being shown in central section; Fig. 2 is an enlarged detail of the means for indicating the meridian of the field under investigation. Fig. 3 is a detail of the arrangement of scales for showing the power of refraction of the lens under investigation. Fig. 4 is a schematic axial sketch of the optical arrangement of the instrument; Fig. 5 is a detail of the means for focalizing and measuring the location of the lens under investigation; and Fig. 6 is a detail of a clip for holding the lens to be tested.

Similar reference characters refer to similar parts throughout the several views.

The instrument may conveniently be mounted upon a suitable frame, 1, which is pivoted at, 2, to a stand, 3, similar to stands employed for the mounting of microscopes and like instruments. At one end of the frame, 1, is the bracket, 4, provided with a tubular portion, 5, into one end of which telescopes a tubular casing, 6, in which is installed a light bulb, 6ª, or other source of illumination. Into the other end of the tubular portion, 5 of the bracket, 4, fits a lens mount, 7, in which are mounted suitable condensers or paralleling refractors, 8. From about the central portion of the frame, 1, arises another bracket, 9, also having a tubular portion 10, similar to and alining with the tubular portion 5 of the bracket 4, except that the tubular portion, 10, has upon the end thereof farthest from the bracket, 4, a surrounding and laterally extending plate 11, the central portion whereof is provided with a circular depression 12 concentric with said tubular portion. Rotatably mounted within the tubular portion, 10, is a tube, 13, upon one end of which is a surrounding and laterally extending flange, 14, which fits and rotates within the depression 12, and on the other end of the tube 13 is secured by a set screw 15, a knurled or checkered collar, 16, by means of which the tube 13 may be rotated. The edge of the face of the flange 14 is provided with a protractor or scale 14ª, which in connection with a mark 11ª, on the plate 11, serves to show the meridional disposition of the target.

Within the end of the tube, 13, adjacent the bracket, 4, is inserted a mount, 17, in which is mounted a target, 18, of a suitable kind to be illuminated by transmitted light. In the opposite end of the tube, 13, is secured a mount, 19, in the inner end of which is a lens, 20, and in the outer end of which is an iris or other suitable diaphragm, 21. The lens, 20, is located just its focal length from the target, 18, so that light proceeding from the target, 18, to the lens, 20, will leave the lens 20, in parallel rays, just as light would fall upon the eye from an object at a considerable distance. Extending upwardly from the frame 1, some little distance from the bracket, 9, is another bracket, 22, upon which is mounted a tube, 23, alining with the tube 13.

In the end of the tube, 23, adjacent the bracket, 9, screws a tube, 24, in the inner end of which is screwed a lens mount, 25, having mounted therein a standard lens, 26, and in the outer end of the tube 24, screws a tube 27, in the outer end of which latter is mounted a cross bracket, 28, for locating the lens to be tested. Normally the face of the locating cross, 28, is just the focal length of the standard lens from the latter, but a scale, 29 is provided upon an annular flange 30 which extends laterally from the end of the tube 27 which together with a mark, 31, upon the tube, 24, permits the positioning of the locating cross, 28, different known distances from the plane of the principal or equivalent focus of the standard lens, 26.

It will now be seen that when the nodal point of a particular lens is known the locating cross can be so adjusted that when the lens is contacting the locating cross its nodal point will be in the plane of the principal focus of a standard lens; or the locating cross can be so adjusted that when the lens to be tested is brought against it it will bear the same relation to the standard lens as it would bear to an eye when in a spectacle or eye glass frame before an eye. In the latter case the actual refracting or correcting power of the lens to be tested can be accurately measured.

Interposed between the brackets 9 and 22 upon the frame 1 is a gibbed track, 32 with a rack, 33 upon the top thereof. Traveling upon the track, 32, is a carriage 34, which is provided with a gear engaging the rack 33 and actuated by a headed arbor, 35, to move the carriage. The carriage 34 is provided with a plurality of spring clips, 36, for holding the lens or lenses to be tested, and the frame, 1, is provided with a scale, 37, so that the lens to be tested can be brought in the desired relation with the standard lens either by moving the carriage so that the lens to be tested will be brought against the locating cross 28, after it has been properly adjusted, or the carriage, 34, may be adjusted by reference to the scale, 37, and independently of the locating cross 28.

The end of the tube 23 opposite to the mounting for the standard lens, is interiorly threaded, at 38, into which screws an exteriorly threaded tube, 39. The gage of the thread at 38, is preferably chosen of a suitable relation to the focal length of the standard lens so that a revolution of the tube 39 will advance or retract the said tube a commensurable extent or proportion of the said focal length. In the end of the tube 39 adjacent the said standard lens is mounted a screen 40, and in the opposite end of the tube, 39, is mounted a suitable magnifying eye-piece, 41, through which an image on the screen may be critically examined.

Secured to the outer end of the tube, 39, is a sleeve 42, which is of a size to telescope about the tube 23, and, in order to accurately measure the movement of the screen with relation to the plane of the principal or equivalent focus of the standard lens, the tube 23 is provided with a scale 43, which coöperates with the sleeve 42 and the end of the sleeve, 42, is provided with a scale, 44, which will show the movement of the screen for fractional revolutions of the sleeve, 42. The scale 43 is placed on the under side of the tube 23, and an inclined mirror, 45, is provided so as to permit of the easy reading of the scales, 43, and 44, from the eye piece end of the apparatus. The scales 43 and 44, are preferably made to show the change in refraction effected by the movement in diopters instead of in a ratio of the focal length of the standard lens.

The optical action of my present invention can best be considered by reference to the schematic view shown in Fig. 4. The target is evenly illuminated through the paralleling refractors by means of or from the source of illumination. The light proceeding from the target is rendered parallel by means of the second paralleling lens which is positioned its focal length away from the target, and would thus proceed to the standard lens unless modified by the lens to be tested. The lens to be tested is placed either in or in definate relation to the plane of the principal or equivalent focus of the standard lens. If the lens to be tested were not interposed in the optical axis of the instrument the standard lens would focalize parallel rays from the target at the plane of its principal or equivalent focus, where they would be received upon the screen, but when the lens to be tested is interposed in the optical axis of the instrument the plane of the formation of the image is moved backward or forward in accordance with whether the lens to be tested is a plus or minus lens and the ratio of its movement to the focal length of the standard lens will give the amount of change in terms of the focal length or refraction of the standard lens. This movement is accurately ascertained by the scales 43 and 44 when the screen is brought into position to receive an image of critical definition. With the provision for adjusting the location of the lens to be tested it is possible to measure the absolute focalizing power of the lens to be tested when the nodal point of said lens is brought into the plane of the principal focus of the standard lens, or what is equally important, measure the refraction it will effect when brought the normal distance in front of the eye from the plane of the principal focus of the standard lens.

It is also possible with the instrument herein described to eliminate an error heretofore common where the necessary correction is of a compound character. The necessary correction is found by placing the spheres, cylinders and prisms in the lens clips of a test frame upon the patient until satisfactory vision is secured. The operator then adds together the refractive values of the elements he employs. But in view of the fact that each element occupies a separate plane this addition does not give a single compound lens which will have the power of the elements in the test frame. With my instrument the elements found necessary in the test frame may be inserted in the clips 36, and the true refractive value of the combination read, which will of course be the value of the lens which should be given the patient.

Having described my invention what I claim as new and desire to secure by Letters Patent is:

1. A lens testing instrument comprising a target; a lens positioned to parallel rays proceeding from said target, a standard lens disposed in the path of said parallel rays, means for locating a lens to be tested between said lenses and in known relation to the plane of the equivalent focus of said standard lens, a movable screen, and scales for disclosing the amount of movement of said screen from the conjugate equivalent focus of said standard lens.

2. A lens testing instrument comprising a target, a lens positioned to parallel rays proceeding from said target, a standard lens disposed in the path of said parallel rays, means for locating a lens to be tested between the lenses and in known relation to the plane of the equivalent focus of said standard lens, a movable screen, and scales for disclosing the amount of movement of said screen from the conjugate equivalent focus of said standard lens in terms of the change of refraction equivalent to such movement.

3. A lens testing instrument comprising a target, a lens positioned to parallel rays proceeding from said target, a standard lens disposed in the path of said parallel rays, adjustable means for locating a lens to be tested between said lenses and in known relation to the plane of the equivalent focus of said standard lens, a movable screen, and scales for disclosing the movement of said screen from the conjugate equivalent focus of said standard lens.

4. A lens testing instrument comprising a target, a lens positioned to parallel rays proceeding from said target, a standard lens disposed in the path of said parallel rays, means for locating a lens to be tested between said lenses and at a known relation to the plane of the equivalent focus of said standard lens, and means for viewing the image focalized by said standard lens.

5. A lens testing instrument comprising a target, a lens positioned to parallel rays proceeding from said target, a standard lens disposed in the path of said parallel rays, means for locating a lens to be tested between said lenses and at a known relation to the plane of equivalent focus of said standard lens, means for viewing the image focalized by said standard lens, and means for measuring the relation of location of the image focalized by the standard lens and the plane of equivalent focus thereof.

6. A lens testing instrument comprising a target, a lens positioned to parallel rays proceeding from said target, a standard lens disposed in the path of said parallel rays, means for locating a lens to be tested between said lenses and at a known relation to the plane of equivalent focus of said standard lens, means for viewing the image focalized by said standard lens, and means for measuring the relation of location of the image focalized by the standard lens and the plane of equivalent focus thereof in terms of the refraction indicated by such location.

7. A lens testing instrument comprising a target, means for rotating said target, a lens positioned to parallel rays proceeding from said target, a standard lens disposed in the path of said parallel rays, means for locating a lens to be tested between said lenses and in known relation to the plane of equivalent focus of said standard lens, means for viewing the image focalized by said standard lens, and means for measuring the relation of location between the image focalized by the standard lens and the plane of equivalent focus thereof.

8. A lens testing instrument comprising a target, means for rotating said target, means for indicating the meridional disposition of said target, a lens positioned to parallel rays proceeding from said target, a standard lens disposed in the path of said parallel rays, means for locating a lens to be tested between said lenses and in known relation to the plane or equivalent focus of said standard lens, means for viewing the image focalized by said standard lens, and means for measuring the relation of location of the image focalized by the standard lens and the plane of equivalent focus thereof.

In testimony whereof I have hereunto set my name in the presence of two witnesses.

CHARLES J. TROPPMAN.

Witnesses:
EDWARD S. CRAVEN,
EDWARD E. SWADRIER.